Nov. 7, 1961 D. JAFFE ET AL 3,007,988
THERMOCOUPLE SYSTEM
Filed March 29, 1960
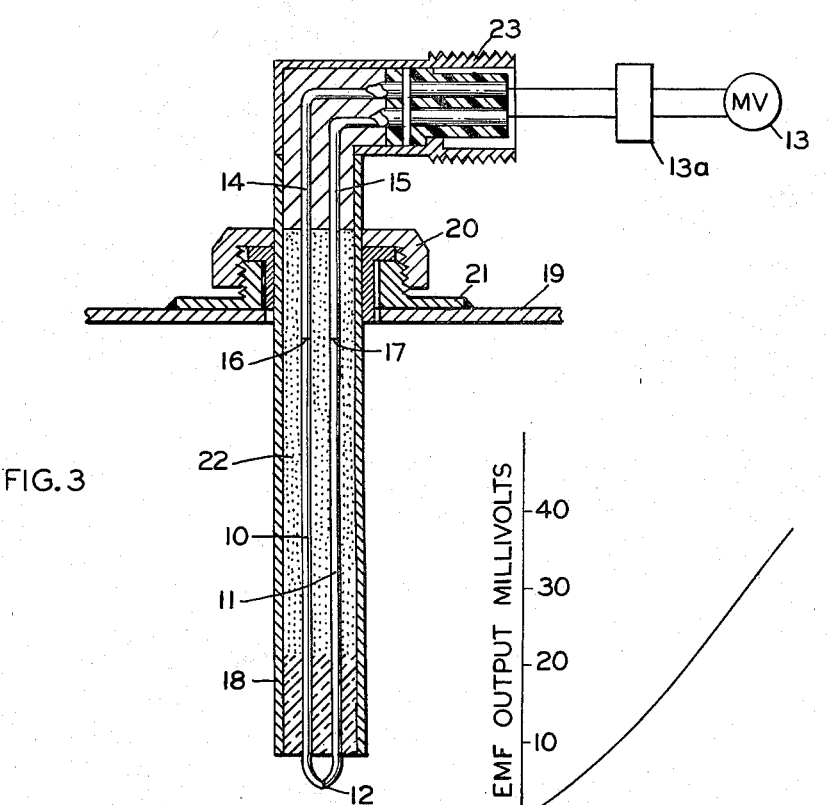
FIG. 3
FIG. 1
FIG. 2
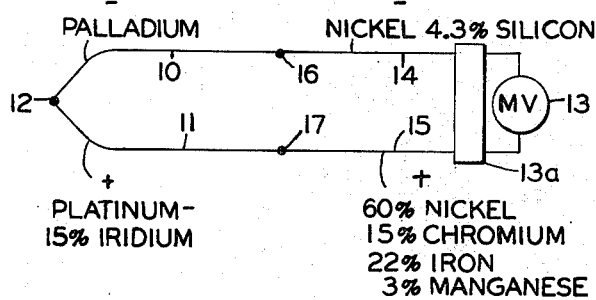
INVENTORS
DONALD JAFFE
MARION C. HALLINAN
BY Richard E. Hosley
THEIR ATTORNEY

United States Patent Office 3,007,988
Patented Nov. 7, 1961

3,007,988
THERMOCOUPLE SYSTEM
Donald Jaffe, Pittsburgh, Pa., and Marion C. Hallinan, Beverly, Mass., assignors to General Electric Company, a corporation of New York
Filed Mar. 29, 1960, Ser. No. 18,285
1 Claim. (Cl. 136—4)

This invention relates to a thermocouple system and more particularly to a thermocouple temperature measuring system comprising thermoelements enabling operation at elevated temperatures under adverse conditions.

Thermocouples are commonly utilized in gas turbine engines to sense the temperature of the gas in order to control the fuel flow to the engine and perform other control functions to prevent engine temperatures from exceeding certain critical values which may damage or destroy the engine.

The gas temperature of such engines may often be relatively high, 2000° Fahrenheit or over, and the atmosphere may be oxidizing. Thermocouples operating under such conditions should be sensitive to temperature changes, that is, provide as large a change of output voltage as possible for a given change of temperature to which the thermocouple junction is exposed, while at the same time provide a relatively stable output versus temperature characteristic for extended periods of operation. Furthermore, such thermocouples should be relatively inexpensive and should be rugged, non brittle, and shock resistant.

Prior art devices have proved inadequate under certain operating conditions, particularly high temperatures, in providing all of the desirable characteristics listed above.

In order to provide thermocouples having the desired characteristics set forth above, thermoelements constructed of noble metals have been used. One such thermocouple which has been found to be satisfactory is disclosed and claimed in a copending application Serial No. 18,312 filed Mar. 29, 1960 by Michael E. Ihnat, entitled "Thermocouple" and assigned to the same assignee as the present invention. This thermocouple has a pair of thermocouple leads or thermoelements constructed of palladium and platinum containing approximately 15 percent iridium respectively.

In thermocouple measuring systems it is customary to connect the temperature measuring junction of the thermoelements to the temperature reference junction by lead conductors constructed of the same materials as the thermoelements to avoid measurement errors that would otherwise arise from thermoelectric effects occurring at the junctions of the thermoelements and the lead conductors. However, where the thermoelements are formed of expensive noble metals, this practice becomes prohibitively expensive for many applications, particularly where lead conductors of substantial length are required.

Accordingly, it is an important object of the invention to provide a thermocouple system utilizing noble metal thermoelements which permits use of relatively inexpensive base metal lead conductors without serious temperature measurement error due to thermoelectric effects occurring at the junction of the thermoelement and lead conductors.

Other objects of the invention will become apparent as the following description proceeds, and the features of novelty which characterize the invention will be pointed out with particularity in the claim annexed to and forming a part of this specification.

In accordance with one form of the invention, a thermocouple temperature measuring system is provided comprising a pair of noble metal thermoelement conductors connected at one end to form the temperature measuring junction. A pair of lead conductors constructed of relatively inexpensive base metals is connected at one end to form the temperature reference junction. The remaining ends of the thermoelement and lead conductors are electrically connected to form a series circuit through the conductors and junctions and a millivoltmeter is connected in the circuit to measure the electrical output of the interconnected thermoelectric and lead conductors. In order to avoid temperature measurement error due to undesired thermoelectric effects at the junctions of the lead and thermoelectric conductors the lead conductors are constructed of conducting materials selected such that the thermoelectric E.M.F. output of the lead conductors closely matches the thermoelectric E.M.F. output of the thermoelectric conductors over a substantial range of the temperatures to be measured.

For a better understanding of this invention, reference may be had to the following description taken in connection with the accompanying drawing in which:

FIG. 1 is a circuit diagram showing how the thermoelement and lead conductors of the thermocouple system are interconnected;

FIG. 2 is a graphical representation showing the E.M.F. output in millivolts of the noble metal thermocouple elements over the operating temperature range; and FIG. 3 shows a sheathed thermocouple construction in which the thermoelement and lead conductors are supported in a housing adapted to be mounted so as to extend through an aperture in the wall of a gas turbine.

Referring now to FIG. 1 of the drawing, there is shown a thermocouple system in which thermoelectric conductors 10 and 11 are joined at 12 to form a temperature measurement (hot) junction 12. In order to stand high temperatures and oxidizing, corrosive atmospheres encountered, for example, in the hot gas stream of a jet engine, the thermoelectric conductors 10 and 11 are constucted of noble metals which will withstand such adverse operating conditions. The negative conductor 10 is formed of palladium and the positive conductor 11 is formed of an alloy comprising platinum and 15 percent iridium. Palladium provides a relatively high negative E.M.F. with respect to platinum. The thermoelectric E.M.F output of the platinum 15 percent iridium/palladium thermocouple with temperatures exceeding 2000° F. is shown by the curve in FIG. 2 from which it will be noted that the E.M.F. output rises to approximately 33 millivolts at 2000° F.

In order to measure the electrical output of the thermocouple and thus obtain an indication of the temperature at junction 12, there is provided a conventional millivoltmeter 13 which is connected to the thermoelectric conductors 10 and 11 by the lead conductors 14 and 15. It will be understood that the lead conductors are joined at one end to form a temperature reference (cold) junction 13a which is usually associated with the millivoltmeter 13. The other ends of the lead conductors 14 and 15 are joined to the thermoelectric conductors by electrical connections at points 16 and 17 so that there exists a series circuit through the four conductors 10, 11, 14, and 15 and the hot and cold junctions.

In order to conserve the expensive noble metal thermoelement conductors 10 and 11, it is desirable to construct the lead conductors 14 and 15 of less expensive base metals. However, when this is done, thermoelectric effects occur at the junctions of dissimilar metals at connections 16 and 17 which are apt to give rise to serious temperature measurement error particularly in applications where the connections 16 and 17 are exposed to variable elevated temperatures. In accordance with the present invention, this difficulty is eliminated or at least greatly reduced by constructing the lead conductors 14 and 15 of metallic materials selected such that the thermoelectric E.M.F. output of the lead conductors closely matches the thermoelectric E.M.F. output of the thermoelement conductors 10 and 11 over a substantial range of the measured temperatures.

To accomplish the thermoelectric matching characteristic in a thermocouple system utilizing a temperature measuring thermocouple consisting of platinum—15 percent iridium/palladium thermoelements, an investigation was made of the thermoelectric characteristics of commercially available lead conductors. None were found that matched the characteristic shown in FIG. 2 sufficiently close to give the desired temperature measurement accuracy. It was determined by experiment that close correspondence could be obtained by constructing the positive lead conductor of a commercially available alloy sold under the trade name Nichrome comprising approximately 60 percent nickel, 15 percent chromium, 22 percent iron, and 3 percent manganese, and forming the negative lead conductor of an alloy comprising nickel and approximately 4.3 percent silicon. During this investigation it was found that the thermoelectric E.M.F. varied with the amount of silicon in the nickel silicon alloy. The Nichrome was annealed at 1830° F. for 30 minutes and the nickel/4.3 percent silicon alloy was annealed at 1750° F. for one hour. The degree of matching obtained was determined by placing a lead conductor junction against the noble metal junction in a furnace at known temperature and separately measuring the thermoelectric outputs of these two junctions. The high degree of correspondence obtained is shown in Table I which indicates the deviation of the lead conductor E.M.F. output relative to the noble metal thermoelectric E.M.F. output.

Table I

| Temperature, Deg. F. | Percent Deviation In Millivolt Output |
| --- | --- |
| 263 | −0.47 |
| 499 | −0.71 |
| 780 | +0.56 |
| 1,010 | +0.53 |
| 1,316 | −0.39 |
| 1,442 | −1.40 |

From Table I it will be noted that the good correspondence was obtained for over half of the operating temperature range of the platinum—15 percent iridium/palladium thermocouple Results obtained when the lead conductors are connected in the system shown in FIG. 1 are indicated by Table II which shows a comparison of the E.M.F. output of the platinum—15 percent iridium/palladium thermocouple alone (Column A) with the system including the matching Nichrome/nickel—4.3 percent silicon lead conductors (column B).

Table II

[Reference junction 13a at 32° F.]

| Temperature, Deg. F. | A T/C E.M.F. Output In Millivolts | B System E.M.F. Output In Millivolts |
| --- | --- | --- |
| 250 | 2.29 | 2.32 |
| 500 | 5.38 | 5.46 |
| 750 | 8.94 | 9.06 |
| 1,000 | 12.94 | 13.04 |
| 1,250 | 17.39 | 17.46 |
| 1,500 | 22.25 | 22.27 |
| 2,000 | 33.12 | 32.65 |

In FIG. 3 of the drawing there is shown a sheathed thermocouple construction in which the thermoelement and lead conductors are supported in a housing adapted to be mounted so as to extend through an aperture in a wall of a gas turbine.

Referring now to FIG. 3, the thermocouple assembly includes a cylindrical housing or sheath 18 which is adapted to be mounted through an aperture in a housing wall 19 of a gas turbine power plant or other chamber confining a liquid or gas flow which is to be measured through a threaded nut 20 associated with the sheath or through other suitable fastening means which cooperate with threaded flange 21 welded or brazed to the housing wall.

Extending through the base of the sheath 18 is the pair of thermocouple conductors or thermoelements 10 and 11 which are insulated from each other and from the sheath 18 by an insulating material 22 such as powdered MgO, MgO and glass, or $Al_2O_3$.

The thermoelements 10 and 11 extend beyond the bottom of the housing 18 and are welded to form the thermocouple junction 12. In order to prevent the powdered core material from flaking off or decomposing at the junction end of the housing 18, a confining means such as core plug may be utilized to seal the junction end. The insulating powder and core plug may be fabricated in a manner more fully described in United States Patent 2,587,391, entitled "Thermocouple," filed June 10, 1949 by John D. Seaver, issued February 26, 1952, and assigned to the same assignee as the present invention.

The thermoelements 10 and 11 are welded or brazed to lead wires 14 and 15 at junctions 16 and 17 respectively and extend through the insulating material 22 to a connector 23 which, in turn, is electrically connected to the millivoltmeter 13.

It will be noted that the connections or junctions 16 and 17 are insulated and sufficiently removed from the high temperature zone adjacent junction 12 so that the temperature limits of the lead conductors 14 and 15, which are less than the noble metal conductors 10 and 11, are not exceeded. However, the junctions 16 and 17 will experience a substantial variation of elevated temperatures and it is therefore important that the thermoelectric E.M.F. output of the lead conductors 14 and 15 match the thermoelectric E.M.F. output of the noble metal thermoelectric conductors 10 and 11 over a substantial range of the E.M.F. output shown in FIG. 2. The data set forth in Tables I and II shows that this has been accomplished.

Although this invention has been described by reference to particular embodiments thereof, it will be understood by those skilled in the art that numerous modifications and substitutions may be effected without departing either in spirit or scope from this invention in its broadest aspects.

What we claim as new and desire to secure by Letters Patent of the United States is:

A high-temperature thermocouple system comprising interconnected and thermoelectrically matched pairs of thermoelectric conductors and lead conductors wherein one of the thermoelectric conductors is formed of palladium and the other thermoelectric conductor is formed of an alloy comprising platinum and approximately 15 percent iridium and one of the lead conductors is formed of an alloy comprising nickel and approximately 4.3 percent silicon and the other lead conductor is formed of an alloy comprising approximately 60 percent nickel, 15 percent chromium, and 22 percent iron.

References Cited in the file of this patent

UNITED STATES PATENTS

| 1,025,715 | Peake | May 7, 1912 |
| 2,012,465 | Godecke | Aug. 27, 1935 |

OTHER REFERENCES

"Thermal E.M.F.'s of Metals and Alloys," American Institute of Physics, Lohr, J. M. et al.; 1232–1235, Symposium, Reinhold Publishing Corp.

Temperature, its Measurement and Control in Science and Industry.